United States Patent [19]

Xhonneux

[11] 4,317,733
[45] Mar. 2, 1982

[54] WATER PURIFICATION EQUIPMENT

[76] Inventor: Gilberte M. J. Xhonneux, Sint-Pieters-Woluwé, 1150 Brussels, Belgium

[21] Appl. No.: 102,343

[22] Filed: Dec. 11, 1979

[30] Foreign Application Priority Data

Dec. 15, 1978 [NL] Netherlands .......... 7812211

[51] Int. Cl.³ .......... C02F 1/50; C02F 1/76
[52] U.S. Cl. .......... 210/752; 210/753; 210/756; 210/758; 210/764; 210/793; 210/202; 210/206; 210/262; 210/275
[58] Field of Search .......... 137/268; 210/50, 62, 210/63 R, 64, 735, 82, 90, 97, 121, 129, 167, 169, 195.1, 198 R, 202, 206, 256, 260–262, 265, 275, 721, 752–756, 758, 793–795, 807; 422/264, 265

[56] References Cited

U.S. PATENT DOCUMENTS

| 448,122 | 3/1891 | Chancellor | 210/206 |
|---|---|---|---|
| 1,149,045 | 8/1915 | Greth et al. | 210/202 |
| 2,311,519 | 2/1943 | Carring | 210/206 |
| 2,879,891 | 3/1959 | Beohner et al. | 210/82 |
| 2,904,062 | 9/1959 | Techler | 422/264 |
| 3,167,506 | 1/1965 | Fackler et al. | 210/63 R |
| 3,230,137 | 1/1966 | Ellison | 210/64 |
| 3,507,624 | 4/1970 | Schneider et al. | 137/268 |
| 3,579,440 | 5/1971 | Bradley | 210/62 |
| 3,772,193 | 11/1973 | Nelli et al. | 210/62 |
| 4,043,932 | 8/1977 | Fresenius | 210/64 |

FOREIGN PATENT DOCUMENTS

1198676 7/1970 United Kingdom .......... 210/63 R

Primary Examiner—Peter A. Hruskoci
Attorney, Agent, or Firm—Cushman, Darby & Cushman

[57] ABSTRACT

There is described a device comprising a filtering compartment enclosing a filtering body, an inlet for unfiltered water and an outlet for filtered water, said inlet being preceded by a liquid-receiving compartment which communicates with a container containing a sterilizing product at a level lower than the highest permissible water level inside said receiving compartment and above the filtered water outlet level.

27 Claims, 5 Drawing Figures

WATER PURIFICATION EQUIPMENT

The invention relates to a water purification equipment comprising a filtering compartment containing a filtering medium and with an inlet for unfiltered water and an outlet for filtered water, whereby the outlet is located at a higher level than the filtering medium.

The invention is more specifically related to an installation designed to produce drinking water from polluted water and especially from rainwater, nearly automatically by means of an internal self-controlling sterilizing device in such a way that no technical skill is required for erecting, starting and maintaining the installation.

The already known purification equipments of this kind often have one or several of the following disadvantages:

necessity to rely on sensitive and often complicated mechanical and/or electrical services to keep the system under control;

necessity to rely on a power source and more specifically on electrical power;

necessity to rely on skilled manpower for erecting, adjusting and maintaining the purification equipment;

necessity to relay on liquid sterilizing products which are cumbersome and dangerous to handle;

necessity to rely on a metering pump to inject the liquid sterilizing product into rain water;

relatively high investment cost due to the control devices.

Quite obviously, such drawbacks are likely to strongly reduce the possible application of these known purification installations in industrialized countries and to make their use practically impossible in developing countries, more precisely in the rural areas thereof.

The invention has thus mainly for object the design of an installation to produce drinking water from polluted soft water and more especially from rainwater.

To this end, said water inlet is preceded by a receiving compartment which is connected to a sterilizing product container at a level below the highest possible water level in said receiving compartment and above the level of the filtered water outlet.

In a particular embodiment of the invention, the container is fitted with a water-permeable wall ensuring a connection with the receiving compartment.

Other characteristics and advantages of the invention will stand out from the following description of several specific embodiment of the purification equipment according to the invention; this description is only given by way of example and does not limit the invention in any way; the reference numerals in this description pertain to the accompanying drawings.

In all these figures the same reference numerals pertain to identical or similar elements.

Although the equipment according to the invention could be used to purify waters of any origin, the following description is more specifically related to a rainwater purification equipment, said water being directly collected from roofs, platforms, etc, and thus often undergoing physical, chemical or bacteriological pollution by various impurities, whereby the treated water is made perfectly potable.

Figure 1:
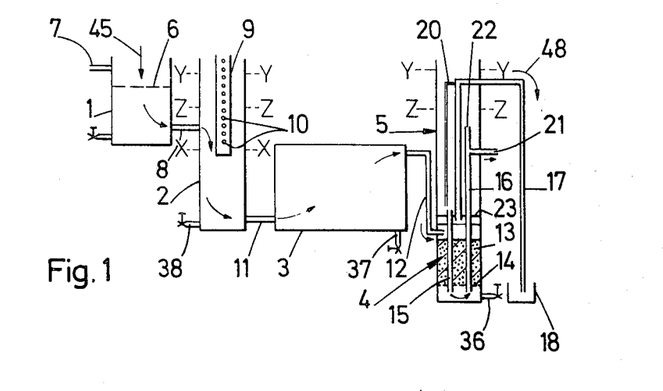
FIG. 1 is a schematic representation of the purification equipment according to the invention.

The type of purification equipment according to the invention, which is schematically shown in FIG. 1, includes the following successive elements: a strainer 1, a sterilizer 2, a settling tank 3, a filtering compartment 4 and above the latter a backwash water container 5.

The strainer often includes a horizontal sieve with wide openings 6 to retain coarse solid particles which are conveyed with the water such as for example leaves, wood pieces, gravel, etc. Above said sieve, an overflow outlet 7 is provided to let excess water flow either to the sewer or to a polluted water tank in case of a rainfall rate higher than the maximum flow rate of the strainer.

Near the bottom of said strainer, a connecting pipe 8 connects the strainer to the sterilizer 2 which includes a container or more precisely a vertical shaft 9, with a wall located below the highest permissible level in the strainer and above the minimum water level in the sterilizer (corresponding to zero flow condition), whereby said wall is at least partially permeable to water, for instance through a plurality of holes 10.

The sterilizing product in solid and soluble form is poured into said shaft in such a way that the resulting saturated solution can diffuse through the holes 10 into the liquid already prefiltered by the strainer.

The sterilizing solid soluble product is preferably a chlorinating product and more specifically calcium hypochlorite which, besides water chlorination, also ensures a small calcium addition to the water. Other oxidizing soluble solid products, as for instance potassium permanganate could also be resorted to depending on the specific uses of the purified water. Other soluble additives could also be poured optionally into shaft 9, as for instance magnesium, fluorine compounds and similar, depending on the requirements of the national health authorities.

The sterilizer 2 is connected through connecting pipe 11 to the bottom of the settling tank 3 while a connecting pipe 12 connects the upper part of this latter tank to the filtering compartment 4.

Said pipe 12 has an outlet within the filtering compartment above the filtering medium 13 which is comprised of layers from solid filtering particles, preferably active coal, which are supported by a floor 14 fitted with sieves and located slightly above the bottom of the filtering compartment. That part of the filtering compartment to which pipe 12 is connected is the inlet part, while the part located below floor 14 is the outlet part of the filtering compartment 4. From this outlet part a vertical tube 15 extends up to above the filtering compartment, at the level of the bottom of the backwash water container 5.

Another vertical tube 16 also extends from said outlet part through the whole backwash water tank to a definite height in this latter one which is a function of the required amount of backwash liquid to clean the filtering medium 13. This tube 16 is fitted near its top end 22 with a lateral branching forming the outlet 21 for filtered and thus drinking water. This tube 16 has open top end 22 which actually serves as an overflow outlet for the backwash liquid into tank 5.

Finally, a siphon 17 rises above the filtering medium 13 to a definite height above the free top end of tube 16, and then goes down after a U-bend to an outlet discharging into a bucket 18 at a level lower than the level of the sieve floor 14, while the top edge of bucket 18 (which is open) lies at the level of floor 14.

A side pipe 20 is connected to siphon 17 at a higher level than the free top end 22 of tube 16 and extends downwards to near the bottom of the backwash liquid container. In the type of design as shown in FIG. 1, said bottom is comprised of a partitioning floor 23 between said tank 5 and the filtering compartment 4.

Although the type of design described hereabove for the water purification equipment is completely in accordance with the principle of the invention and although the efficiency thereof is quite satisfactory, it is however clear that such a design has specific drawbacks in many cases, namely for the erection stage where skilled manpower is required for connecting, adjusting and starting the installation.

Furthermore, this design can easily be conveyed and can be erected by an unskilled worker.

Figure 2:
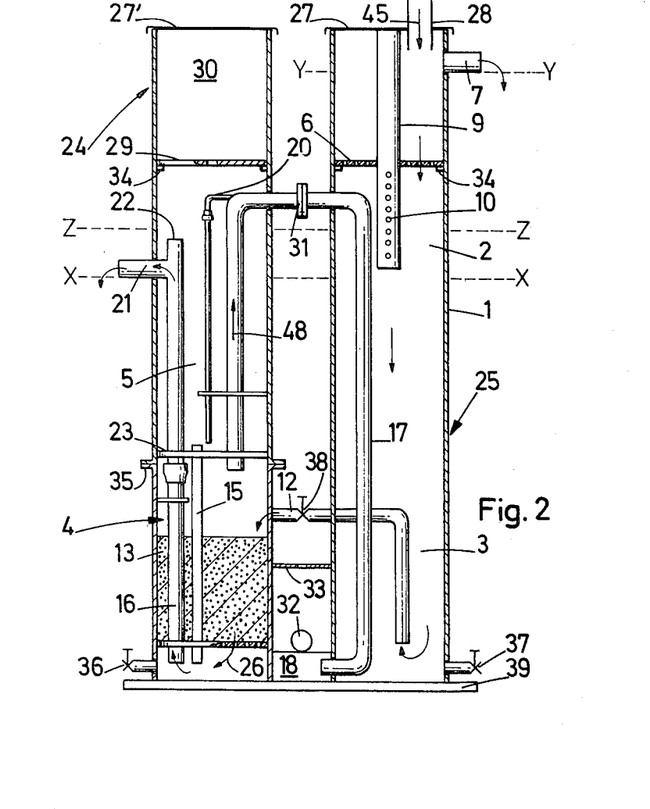
FIG. 2 is a vertical cross-section through a practical and especially useful type of purification equipment according to the invention.

The main difference in FIG. 2, as compared with the design shown in FIG. 1, is the combination of the various compartments into two vertical columns 24 and 25 located close together and fitted with covers 26 and 27 respectively, which are not air tight.

The supply of rain water, from a roof for instance, is fed through a pipe 28 starting from a gutter (not shown), passing through the cover 27 and having its outlet above sieve 6 of strainer 1.

The shaft 9 which contains the sterilizing product extends downwards through sieve 6, whereby the holes 10 of said shaft are located below sieve 6.

The compartment where sterilizing does occur is located all around shaft 9 and extends downwards inside column 25 to the settling tank 3 whereby the upper sterilizing (or chlorinating) compartment and the lower settling tank form one single volume.

Pipe 12 which connects the settling tank to the inlet part of the filtering compartment 4 has a vertical part starting adjacent the bottom of the settling tank in order to make the separation of settled materials easier.

In this way, the chlorinated water is forced downwards through the whole height of the settling tank with a view to making the chlorine/water contact time as long as possible.

The column 24 includes the filtering compartment 4 as well as the upper backwash liquid container 5 separated from the latter one by a floor 23. The container 5 is closed at its upper end by a perforated floor 29 located some distance below cover 26 and thus forming an additional dry compartment 30 where the sterilizing product can be stored. Hence the name of "storage compartment" for said compartment 30.

The siphon is comprised mainly of two parts located each in one of the two columns 24 and 25, as shown in FIG. 2, whereby said two parts are connected by means of a mechanical coupling 31 fitted with a gasket.

The bucket 18 is located between both columns and is fitted with a lateral outlet 32 which is located slightly above the curved outlet from siphon 17 while a perforated floor 33 closes the upper end of said bucket and also acts as a cross-beam between both columns.

It must be emphasized that sieve 6 as well as floor 29 rest freely on supports 34 in order to enable easy removal thereof whenever access to the technical compartments would be necessary.

For the same reasons, column 24 is comprised of two parts which are connected together at the level of the outlet part of the filtering compartment by means of a removable coupling with a water-tight gasket.

A valve, 36, 37 respectively, is provided adjacent the bottom of each column. A similar valve 38 may also be located on pipe 12 between both columns. The whole system is erected on a pedestal 39. The water volume of the purification device before the filtering compartment is called the water-feeding compartment. This compartment thus includes the strainer, the chlorinating device and the settling tank.

Figure 3:
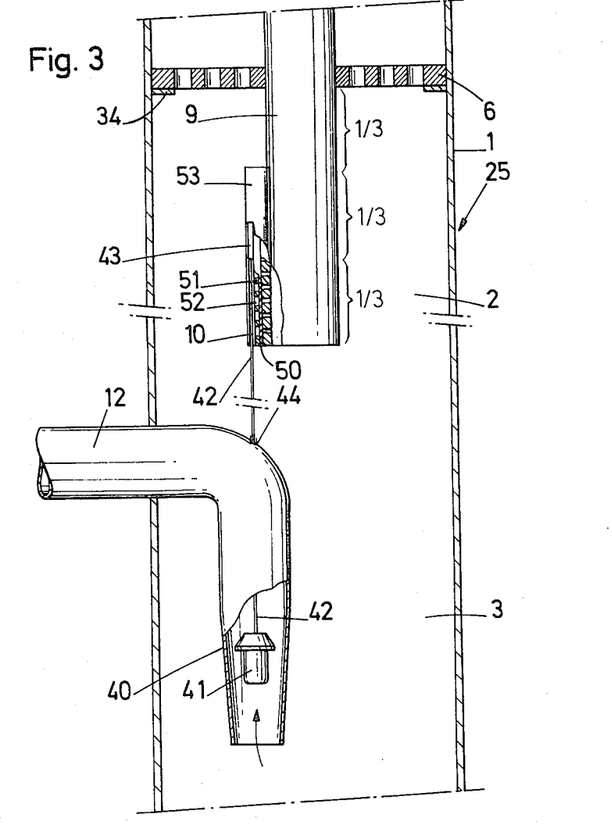
FIG. 3 is a front view with partial cross-sections of an additional element which can be included optionally, as an alternative solution, in the equipment according to FIG. 2.
Figure 4:
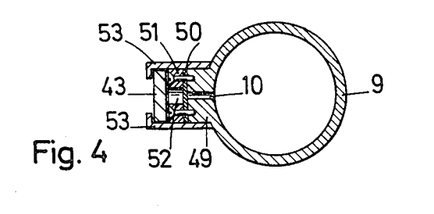
FIG. 4 is a cross-section along line IV—IV of FIG. 3.

FIGS. 3 and 4 show an improved design of a chlorinating device according to the invention and which is suitable for the embodiment shown in FIG. 2.

This design of the chlorinating device has mainly for object to control the water permeability of shaft 9 in function of the liquid flow through the strainer.

To this end, the vertical part of pipe 12 extending inside the settling tank 3 includes a part 40 which is widened upwards and inside which a float 41 is suspended by means of a rod 42, the top part of which is fitted with a slide 43 which can move alongside the holes 10 bored through the wall of shaft 9. In this way, the rod can move up and down through a guide shaft 44 located on the elbow of pipe 42. The water-permeable part of the shaft, i.e. the part where the holes are located, lies at a distance from the lowest part of the strainer sieve which is nearly equal to half the height of said water-permeable part. The connection between the slide and the float is such that when said float lies in the lowermost position thereof, about half the holes 10 are closed.

The holes 10 are located along a vertical line of the shaft wall which is covered locally by a porous layer 50 for instance from plastic material or glass fibres. Said layer is secured by a plate 51 which is perforated with holes 52 having a larger diameter than holes 10 and located in front thereof; whereby said porous layer 50 is provided to reduce the water diffusion velocity.

The up and down movement of slide 43 is guided by guides 53, fastened sidewise along the hole line.

The various specific embodiments of the purification equipment according to the invention, already described and shown in the figures will be further described hereinafter in order to achieve a better understanding of the working principle of some of the elements thereof.

The rainwater, flowing for instance from a gutter, passes through sieve 6 of the strainer, as indicated by arrow 45, and flows into the sterilization compartment 2.

When the rainwater flow rate, for instance in the case of a thunderstorm, is higher than the maximum permissible flow rate of the purification equipment, the excess water is discharged through the overflow outlet 7 either to the sewer or to a polluted-water tank.

In zero-flow conditions, the water flowing through sieve 6 fills the chlorination compartment up to a level XX corresponding to the level of drinking water outlet 21.

In maximum flow conditions, the water head loss in the filtering medium 13 is such that the water level in the chlorination compartment corresponds to the level of the overflow outlet 7.

In an intermediate flow condition between zero flow and maximum flow, the water level ZZ in compartment 2 lies at a height above the minimum level XX which is proportional to the flow rate. As the linearly proportional head loss within the filtering medium is indeed very large as compared to the quadratically proportional head losses in the piping, said latter ones may practically be neglected.

The shaft is filled with calcium hypochlorite pellets. Only those pellets located below the water level are leached by water and gradually dissolved to form a saturated solution. This solution is diluted by diffusion through the holes 10. The chlorine ion flow rate qo of each hole is ruled by the well known diffusion formula $$q_o = \delta \times \frac{c_i - c_e}{e} \times s$$

where $\delta$ is the diffusion coefficient.

$c_i$ is the chlorine concentration within the shaft.

$c_e$ is the chlorine concentration in the chlorination compartment.

s is the cross section area of one hole.

e is the length of a hole, i.e. the wall thickness of the shaft.

For practical reasons, for instance to avoid choking and to make drilling easier, it is unusual to provide a hole diameter smaller than about 2 mm, although holes with various diameters could, however, also be suitable. For a 2 mm diameter by example, the chlorine ion flow rate can be estimated to about 1 g per hour if the wall thickness "e" is equal to 4 mm.

As 1 to 10 holes could presumably be in working condition according to the rain water flow rate, the chlorine flow rate of the sterilizer could thus vary between 1 g and 10 g per hour. Bearing in mind that such a flow rate would be excessive for small or medium sized installation, a decrease in the chlorination rate should thus often be looked for by increasing the wall thickness. This result can practically be achieved by locally oversizing the wall thickness of the shaft.

In the embodiments according to FIGS. 3 and 4, this oversized wall thickness is shown in 49. If, however, the chlorination rate decrease achieved in this way were still insufficient, a porous layer could be resorted to, whereby its thickness and water permeability will be experimentally determined, for instance by a suitable selection of the number of fabric layers and of their physical characteristics.

The water chlorinated in this way then flows through the sterilization compartment and the settling tank where it remains for an adequately long time (generally comprised between 5 and 60 minutes according to the pollution grade of the rainwater) in order to destroy germs and bacteriae.

This contact time is indeed determined by the water flow rate and the total volume capacity (sterilization compartment+settling tank). This total volume capacity is actually comprised of two parts viz:

(1) The water volume below level XX which is kept constant.

(2) The water volume between level XX and level ZZ which is proportional to the water flow rate.

If thus the maximum water flow rate is represented by 100% and the maximum water volume or capacity by 100% as well, the following values are obtained for a water purification equipment built to the design as shown in FIG. 2.

| Water flow rate % | Contact capacity % | Contact capacity water flow rate ratio | Contact time for two column of identical diameter minutes | Contact time for two column with diameter of chlorination column = $\sqrt{2}$ · diameter of filtering column minutes |
| --- | --- | --- | --- | --- |
| 100 | 100 | 1,000 | 5 | 10 |
| 90 | 96 | 1,067 | 5.3 | 10.7 |
| 80 | 92 | 1,150 | 5.7 | 11.5 |
| 70 | 88 | 1,259 | 6.3 | 12.6 |
| 60 | 84 | 1,400 | 7 | 14 |
| 50 | 80 | 1,600 | 8 | 16 |
| 40 | 76 | 1,900 | 9.5 | 19 |
| 30 | 72 | 2,400 | 12 | 24 |
| 20 | 68 | 3,400 | 17 | 34 |
| 10 | 64 | 6,400 | 32 | 64 |
| 5 | 62 | 12,200 | 61 | 122 |
| 0 | 60 | ∞ | ∞ | ∞ |

The fact that the contact time is longer for a small flow rate is of particular advantage; with a fine rain the water flow is indeed quite small but the water may be heavily polluted; on the contrary with storm rain, the dirt from the roof is diluted in a larger amount of water with a corresponding decrease of the pollution grade.

In two right hand columns of the above table, contact times are given which correspond, on the one hand, to two technical columns of identical diameter, and, on the other hand, to a chlorination column with a diameter equal to the filtration column diameter multiplied by $\sqrt{2}$.

Any other ratios and sizes are, of course, possible in order to achieve the contact time which is required from a hygienic viewpoint.

The very coarse impurities such as paper, tree leaves, gravel etc, are retained on sieve 6 of the strainer while coarse impurities such as sand, with a relatively high density, settle down and accumulate on the bottom of the settling tank which can occasionally be cleaned by opening the drainage cock 37 which may also be used to collect a chlorinated water sample and to empty column 25 when the equipment has to be moved away.

The sterilized water then flows into the filtering compartment 4 through pipe 12 and permeates downwards through the active coal filtering medium as shown by arrow 46.

Fine filtration, dechlorination and deodorization simultaneously occur in this compartment, whereby completely drinkable, hygienic and appealing water is obtained at the outlet 21.

The drinking water fills the backwash water tank 5 as well through tube 15.

The siphon is filled with unfiltered water to the level ZZ which corresponds to the water level inside chlorination compartment 2.

Under constant flow rate conditions, the water head losses in the filtering medium are gradually increased by the fine impurities retained within the medium.

When the water level ZZ in the chlorination compartment reaches its maximum value (i.e. YY), the siphon is completely filled.

A water flow is then immediately initiated through siphon 17 and from the filtering compartment 4, as shown by arrow 48.

The stability of this water flow is assured by bucket 18 wherein the free lower outlet of the siphon is immersed.

In such conditions, the water flow velocity is ruled by Toricelli's law i.e. it is proportional to the square root of the height difference between the level XX and the level in the bucket 18. This water flow results in a lowering of the water level in tank 5 from level XX and indirectly, in the chlorination compartment 2 from level ZZ as well. The water is flowing out of tank 5 through tube 15 and then upwards through the filtering medium. In this way, an adequate backwashing and regeneration of the filtering medium 2 is achieved, due to the water velocity being maximum at the very begining and then gradually decreasing with the water level lowering in tank 5.

When tank 5 is nearly empty, air is introduced into the side branch 20 of the siphon where the water flow is interrupted.

From this moment the water purification equipment is again working in normal conditions and water is flowing again downwards through the filtering medium. Filtered water then fills again tube 15 and backwash water tank 40 to level XX.

Water flows simultaneously upwards through tube 16 to the outlet 21. Quite obviously, the heights and cross sections of the various compartments, the grain size of the filtering medium and the backwash velocity are accurately selected to achieve complete removal of the impurities from the filtering medium without filtering particles (and more specifically active coal grains) being uplifted and driven into the siphon.

The embodiment of the water purification equipment according to the invention shown in FIG. 2 can have for instance a total height of 2.50 m if the active coal layer is 0.50 m. thick, whereby the equipment can easily be installed under the gutter of a one-floor housing. If a thinner active coal layer (which would be appropriate in many cases) is chosen, the total height is reduced accordingly. For instance, if the active coal layer is 0.25 m. thick, then the total height of the equipment is reduced to about 1.5 m.

The diameter of the two technical columns 24 and 25 is a function of the desired water flow rate. This flow rate can be as small as 1 m$^3$/h for the smallest types while it is practically unlimited when upscaling the installation is desirable.

Besides active coal, other conventional filtering materials could also be used, such as sand, de-ironing products, hydro-anthracite, etc.

Figure 5:
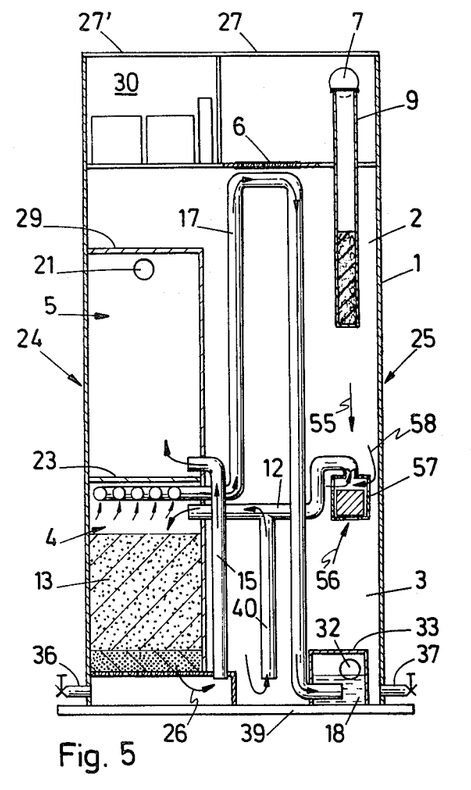
FIG. 5 is a vertical cross-section through an alternative design of the device according to the invention.

FIG. 5 shows another very compact alternative embodiment of the purification device according to the invention.

This device includes, instead of two technical columns, a single box 25 divided into several compartments, viz. one upper compartment containing the strainer 6 and two superimposed side compartments 4 and 5.

Compartment 4 serves as filtering compartment, whereas compartment 5 is the backwash water tank, whereby nearly the whole remaining volume of the box may be considered as forming a sterilisation volume as well as a settling volume 3. The sterilisation volume is characterized by its lateral extension above the backwash water tank over the whole width of the box.

Said increased volume results in an increase of the sterilisation time without any increase of the height of the purification device.

On the other hand, the filtered liquid outlet 21 is provided at the upper part of the backwash water tank 5 at a level corresponding to level XX of FIG. 2.

FIG. 5 also illustrates another form of the backwash flow interruption device which is provided to replace pipe 20 in FIG. 2. According to this alternative embodiment, that part of the filtering compartment located above the filtering medium 13 is connected to the settling compartment 3 through a T-shaped pipe 12 having a depending branch 40 which ends adjacent the bottom of the settling compartment 3 and a branch 55 which forms the flow interruption pipe for siphon 17 and is located in front of the branch ending into the filtering compartment. Said branch 55 ends in the upper part of the settling volume through a valve 56 containing a plugging float 57. This branch 55 is bent upwards in such a way that the water inlet thereof as shown by arrow 58, lies substantially at the height of the bottom of tank 5.

Said backwash flow interruption system permits a more complete use of the water inside tank 5, as compared with the side pipe 20 connected to siphon 17 in the embodiment shown in FIG. 2. This backwash interruption system could of course also be applied to a two-column purification device as shown in FIG. 2.

Conversely the flow interruption pipe 20 could also be suitable for the alternative embodiment with a single compact box, as shown in FIG. 5.

When a water purification equipment according to the invention has to be designed, the necessary calculations include computing the height and section of the filtering medium to meet the required flow rate, and the water head losses under various flow rates and impurities content conditions of the filter, the selection of the contact time and thus the sizing of the chlorination and settling compartments, the sizing of the volume and height of the backwash water tank 5 as well as the number, the spacing, the pattern, the diameter and the length of the holes in the shaft wall of the sterilizer according to the diffusion laws and with or without permeability-controlling fabric layers.

The sterilizer as described hereabove can release chlorine amounts which are proportional to the water height in the chlorination compartments and thus to the water flow rate, in such a way that the chlorine content in the settling tank is kept nearly constant as long as the filtering medium 13 is clean. When this medium becomes dirty, the water level is increased under constant flow conditions whereby the chlorine content of the water is increased accordingly. This fact does not impair in any way the drinkability of the water and could even be considered as an advantage, viz. an increased possibility to oxidize organic impurities retained within the filtering medium.

If, however, this increased chlorine consumption is considered as detrimental (a case which is likely to occur mainly for large size installations), it might be advisable to resort to the control device shown in FIG. 3.

As the length of slide 43 (moving up and down) is about equal to the length of conical part 40, the float 41 is at its lowest possible level for low flow rate and about 50% of the holes of the sterilizer are thus closed by the slide 43.

On the other hand, a high flow rate will raise the float whereby the upper holes of the sterilizer are made operative. Any other intermediate position is of course possible. The working conditions of such a control device are ruled by the well known principle of the rotameter (flowmeter).

It is essential that the moving part of said device be so designed that the apparent weight corresponds exactly to the desirable value.

This can easily be achieved by adjusting the buoyancy of a light plastic foam block fastened to the moving rod 42.

The above description thus shows clearly that the water purification equipment according to the invention operates fully automatically and is self-controlling which obviates any need for motor, pump, electrical or mechanical devices; more precisely, the chlorine concentration in the water and thus the sterilizing effect are nearly constant or vary within a rather narrow range, substantially independently of the instantaneous water flow rate, due to the appropriate combination and the reciprocal actions of natural laws, unlike the known water purification equipments.

The addition of the sterilizing product into the rain water occurs completely automatically without metering pump, under the action of the very simple diffusion and dissolution laws, and with a nearly linear proportionality to the water flow rate, except when the filter is very dirty, in which case the metering might be increased. On the other hand, conventional known purification equipments generally require costly and often unreliable metering pumps to inject a liquid sterilizing product.

When the water purification equipment according to the invention is in service, the maintenance thereof is limited to the addition of sterilizing material inside shaft 9, the periodical removal of settled matter from the settling tank bottom through the drainage cock and the hand removal of very coarse impurities from sieve 6 of the strainer. No technical skill is thus required to carry out these operations. A periodic check of the chlorination efficiency and of the water quality might however be advisable. This checking could be entrusted to the local or national health authorities.

The bucket 18 is so designed that the backwash water and all the impurities thereof are poured into the sewer system under a limited pressure.

The construction materials of such water purification equipments are mainly plastic materials and more precisely polyvinyl chloride.

As far as the sterilizing effect is concerned, it is to be noted that if the filtering medium 13 is made from active carbon, this medium has notably for result the destruction of the last traces of the sterilizing and oxidizing agents, generally comprises of active chlorine. This has for advantage of doing away with objectionable tastes and odours. However a drawback lies in due to said elimination the filtered water being no longer protected against recontamination.

All sterilizing oxidizing agents are indeed oxygenated anions such as $ClO^-$, $IO^-$, $BrO^-$, $MnO^-_4$, which, when filtered through active carbon, are converted into $Cl^-$, $I^-$, $Br^-$, $Mn^{+++}$ ions which are devoid of any sterilizing effect.

To achieve post-sterilization according to the invention, a sterilizing cation is resorted to, instead of an anion. Among said cations, the most efficient one is the silver cation $Ag^+$, the use of which with concentrations generally quite lower than 1 mg/l has been known for a long time. Said $Ag^+$ ion cannot be withdrawn from the water neither by chemical nor by physical means, and thus enables an efficient after-sterilization under acceptable hygienic conditions. As the compounds AgCl, AgI, AgBr are nearly insoluble in water, it is therefor required not to use in the purification device according to the invention, at least when post-sterilization is desirable, the anions $ClO^-$, $IO^-$, $BrO^-$ as presterilizing agents. According to the invention, use is made of the oxidizing ion $MnO_4^+$, preferably in the form of potassium permanganate.

Silver is advantageously added to the water as a soluble salt such as sulphate, fluoride or fluosilicate, whereby the latter two compounds have the additional advantage of introducing some fluorine proportion into the water. The selected silver salt may be mixed to the powdered potassium permanganate, whereby the resultant powder is pelletized thereafter.

This post-sterilization process is, of course, only suitable for chloride-free raw waters.

The invention is by no means limited to the above embodiments and many alternative embodiments could be developed within the scope of the invention.

For instance, the porous layer 50 can be applied to a shaft 9 with or without local wall overthickness and with or without moving slide 43. The injection of the sterilizing product proportionally to the water flow rate may possibly occur by using a liquid product, for instance by means of a float system which is an integral part or not of the purification equipment.

I claim:

1. Water purification equipment comprising: a filtering compartment containing a filtering medium, said filtering compartment having an inlet for unfiltered water and an outlet for filtered water; a liquid-receiving compartment connected to the inlet to the filtering compartment and having an inlet for the liquid to be purified, located above the level of the inlet to the filtering compartment so that the liquid level in the liquid-receiving compartment varies in proportion to the head loss within the filtering medium and to the liquid flow rate in said receiving compartment; and a container having an upstanding water-permeable wall extending in the liquid-receiving compartment up to a level above the level of the filtered water outlet and in the liquid flow through said liquid-receiving compartment, said container containing a sterilizing product which diffuses into the liquid present in the liquid-receiving compartment at a rate proportional to the liquid level in said liquid-receiving compartment.

2. Water purification equipment as defined in claim 1, in which the water permeable container is vertically elongated.

3. Water purification equipment as defined in claim 1, in which the water-permeable wall lies substantially above the level of the filtered water outlet.

4. Water purification equipment as defined in claim 1, in which the water-permeable wall is provided with a plurality of holes in vertical alignment.

5. Water purification equipment as defined in claim 4, in which a diffusion-controlling porous layer covers said holes.

6. Water purification equipment as defined in claim 4, in which the thickness of the wall is greater where the holes are located.

7. Water purification equipment as defined in claim 1, in which means are provided for controlling the water permeability of the sterilizing product container proportionally to the water flow into the liquid-receiving compartment.

8. Water purification equipment as defined in claim 7, in which said means for controlling said water permeability comprise an upstanding pipe with an upward-increasing cross-section which is located before the inlet to the filtering compartment and encloses a float, the float being attached to a slide which can displace the slide up and down alongside a part of the water-permeable wall to close partly said permeable part.

9. Water purification equipment as defined in claim 8, in which the water-permeable part of the container extends below a strainer provided in the liquid receiving compartment up to a distance from this strainer which is substantially equal to half the height of said water-permeable part, whereby sliding movement of the slide is also substantially equal to half the height of said water-permeable part.

10. Water purification equipment as defined in claim 8, in which the slide is so arranged relative to the float, as to have the top half of the permeable wall part of the sterilizing product container closed when the float lies in the lowermost position thereof.

11. Water purification equipment as defined in claim 1, in which a settling tank is located below the liquid-receiving compartment and before the filtering compartment.

12. Water purification equipment as defined in claim 1, in which a backwash liquid tank is arranged at a level above the filtering compartment and connected through the bottom thereof to that part of the filtering compartment located after the filtering medium, on the filtered water outlet side and a siphon rises from that part of the filtering compartment before the filtering medium, on the unfiltered water inlet side, to a determined height which in operation of the equipment will be above the liquid level in the backwash liquid tank and said siphon is bent downwards to have the lower outlet thereof located below the level of the backwash liquid tank.

13. Water purification equipment as defined in claim 12, in which said free end of the siphon opens in a bucket provided with an overflow outlet located adjacent to the level of the filtering medium base.

14. Water purification equipment as defined in claim 12, in which an overflow outlet is provided in the liquid receiving compartment at a level higher than the siphon top level.

15. Water purification device as defined in claim 12, in which the filtered liquid outlet is located in the upper part of the backwash water compartment or tank at a level lower than the upper bent part of the siphon.

16. Water purification equipment as defined in claim 12, in which a side branch pipe of the siphon extends downwards from a level above the filtered water outlet level into the backwash liquid tank down to adjacent the bottom of said tank.

17. Water purification equipment as defined in claim 12, in which that part of the filtering compartment located before the filtering medium is connected to the settling compartment through a T-shaped pipe the depending branch of which extends down to adjacent the settling compartment bottom and the one branch among both other branches on either side of said depending branch, opens inside said filtering compartment part, the third branch opening inside the top part of the settling compartment through a checkvalve with closure float, at a level below the backwash water tank and above the siphon lower end.

18. Water purification equipment as defined in claim 1, in which the filtering medium comprises a bed of filtering particles supported by a bottom with sieves located at some height above the bottom of the filtering compartment, whereby the unfiltered liquid inlet is located at some height above the bottom of the filtering compartment, the unfiltered liquid inlet being located above said bed and a connecting pipe extending to the bottom of the liquid receiving compartment from that part of the filtering compartment lying below the bottom with sieves.

19. Water purification equipment as defined in claim 1, in which a strainer is provided in the receiving compartment before the sterilizing product container.

20. Water purification equipment as defined in claim 1, which further comprises a first vertical column enclosing the filtering compartment and a backwash liquid tank and a second vertical column enclosing the receiving compartment and the sterilizing product container, and a siphon of inverted U-shape, with the one leg in the first column and the second leg in the second column, said second leg ending adjacent the bottom of said second column inside a bucket for discharging the backwash liquid under some pressure.

21. Water purification equipment as defined in claim 1, which comprises a box divided into a plurality of compartments, on the one side said liquid receiving compartment enclosing a strainer and, on the other side, two superimposed side compartments, the lower one containing the filtering medium and the upper one forming a backwash water tank, whereby said liquid receiving compartment comprises a sterilizing zone and a settling zone, said sterilizing zone having a sidewise extension above the backwash water tank, over the whole box width.

22. Water purification equipment as defined in claim 1, in which that part of the filtering compartment located after the filtering medium is directly connected through at least one separate pipe to said filtered liquid outlet.

23. Water purification equipment as defined in claim 22, wherein said backwash means includes a backwash tank and wherein said connecting pipe has an opening connecting to the backwash liquid tank, said opening being located at a level higher than said filtered water outlet.

24. Water purification equipment as in claim 1 wherein said container is disposed within said liquid-receiving chamber in such a manner that said inlet for liquid-receiving compartment is located outside said container whereby liquid flows along the outside of said container.

25. A process for purifying a water flow by sterilization and filtration which comprises: withholding, prior to filtration, the water flow in a liquid receiving compartment so as to form a water column of which the height is a function of the head loss created during the subsequent filtration; providing in said water column a container having a permeable upstanding wall and containing a sterilizing product, said permeable wall extending up to a level above the level of water in the water column thereby diffusing the sterilizing product in the water column at a rate which is proportional to the height of said column; flowing the water from the liquid receiving compartment through a filter bed thereby effecting said head loss; stopping the filtration and performing a backwash when the height of the water column has reached a predetermined level so as to eliminate the impurities which have been retained during the filtration and to bring again the head loss created during filtration to an initial level; and starting again the filtration.

26. A process as in claim 25 which further comprises using a soluble silver salt, combined with soluble permanganate pellets, as a post-sterilization agent.

27. A process as in claim 26 wherein the silver salt is silver fluoride or silver fluosilicate.

* * * * *